United States Patent [19]
Eaton

[11] 3,974,676
[45] Aug. 17, 1976

[54] TUBE BENDING MACHINE AND CARRIAGE THEREFOR

[75] Inventor: Homer L. Eaton, Balboa, Calif.

[73] Assignee: Eaton-Leonard Corporation, Santa Ana, Calif.

[22] Filed: Apr. 11, 1975

[21] Appl. No.: 567,288

[52] U.S. Cl. .................................. 72/307; 72/419; 74/27; 74/760
[51] Int. Cl.² .................... G06F 15/46; B21D 7/12; F16H 21/16
[58] Field of Search ............ 72/307, 419, 149, 150, 72/421, 422; 214/338; 226/162; 74/27, 24, 23, 37, 89.2, 760

[56] References Cited
UNITED STATES PATENTS

| 2,756,133 | 7/1956 | Butzin | 74/27 X |
| 2,909,935 | 10/1959 | Dodge | 74/27 |
| 3,145,756 | 8/1964 | Hill | 72/DIG. 22 |
| 3,472,097 | 10/1969 | Huska | 74/760 |
| 3,487,723 | 1/1970 | Prot | 74/760 X |
| 3,821,525 | 6/1974 | Eaton et al. | 72/DIG. 22 |

Primary Examiner—Milton S. Mehr
Attorney, Agent, or Firm—Gausewitz, Carr & Rothenberg

[57] ABSTRACT

A tube bending machine includes a carriage mounted rotatable chuck for grasping and positioning a length of tube with respect to the bending head of the machine. Motion of the carriage along the bed of the machine toward the bending head and rotation of the chuck relative to the carriage are both powered by a single remotely mounted motor driving an endless chain. The chain engages a drive sprocket rotatable on the carriage and gear connected to rotate the chuck. A chuck brake and a carriage distance brake are selectively energized so that when chuck rotation is prevented, the sprocket is locked to the chain and the carriage will be driven by the chain, and when carriage travel is prevented, the chuck is rotated by the chain driven sprocket. The remote motor is connected in a primary servo system to provide a closed loop drive of either the chuck rotation or the carriage travel. A closed loop brake control system is provided for each of the chuck rotation and carriage travel. The position error signal of the motor servo system is compared with a signal representing actual velocity of the chuck or carriage and a second error signal proportional to the difference between the position error and the actual velocity is employed to proportionally energize the corresponding brake.

23 Claims, 9 Drawing Figures

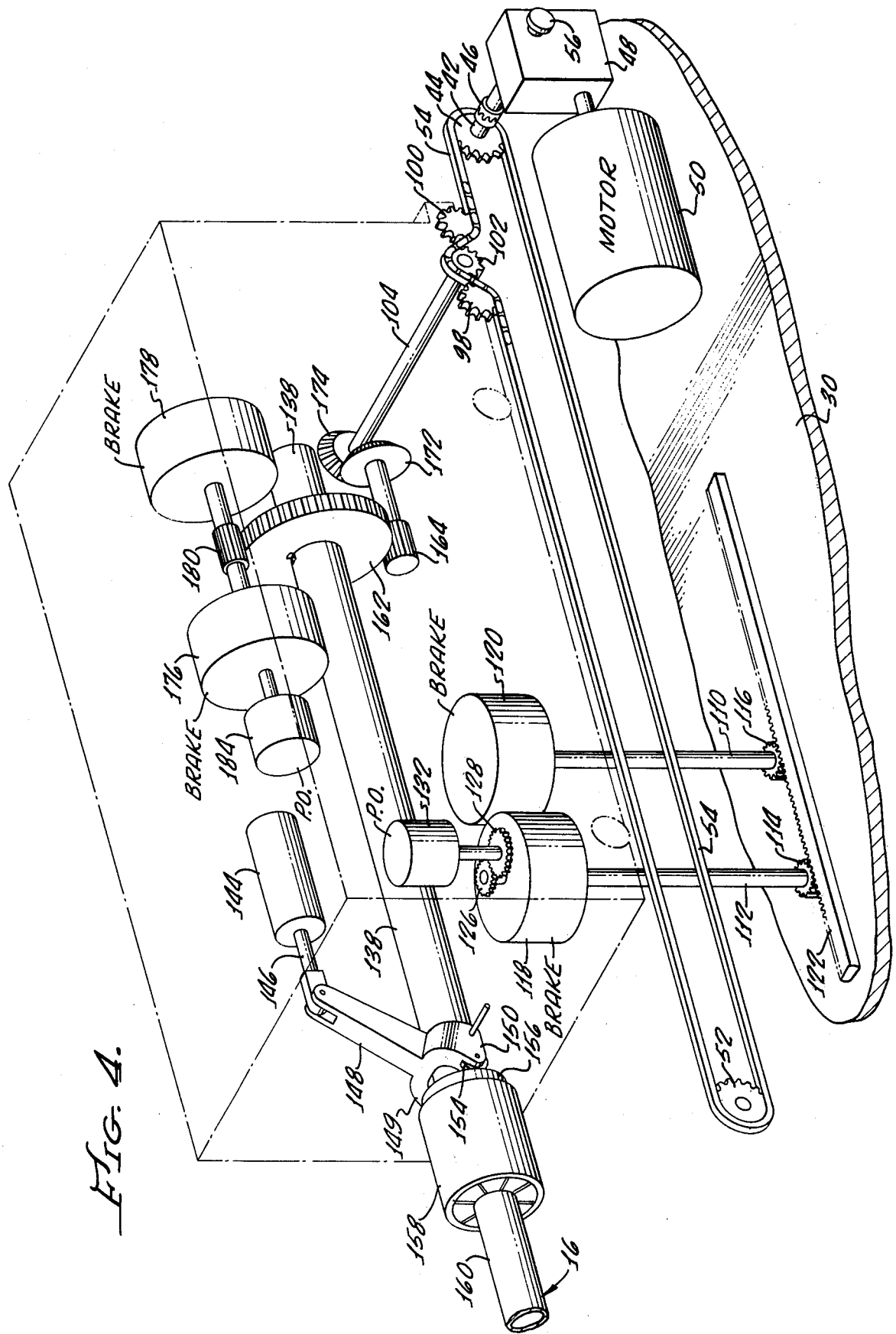

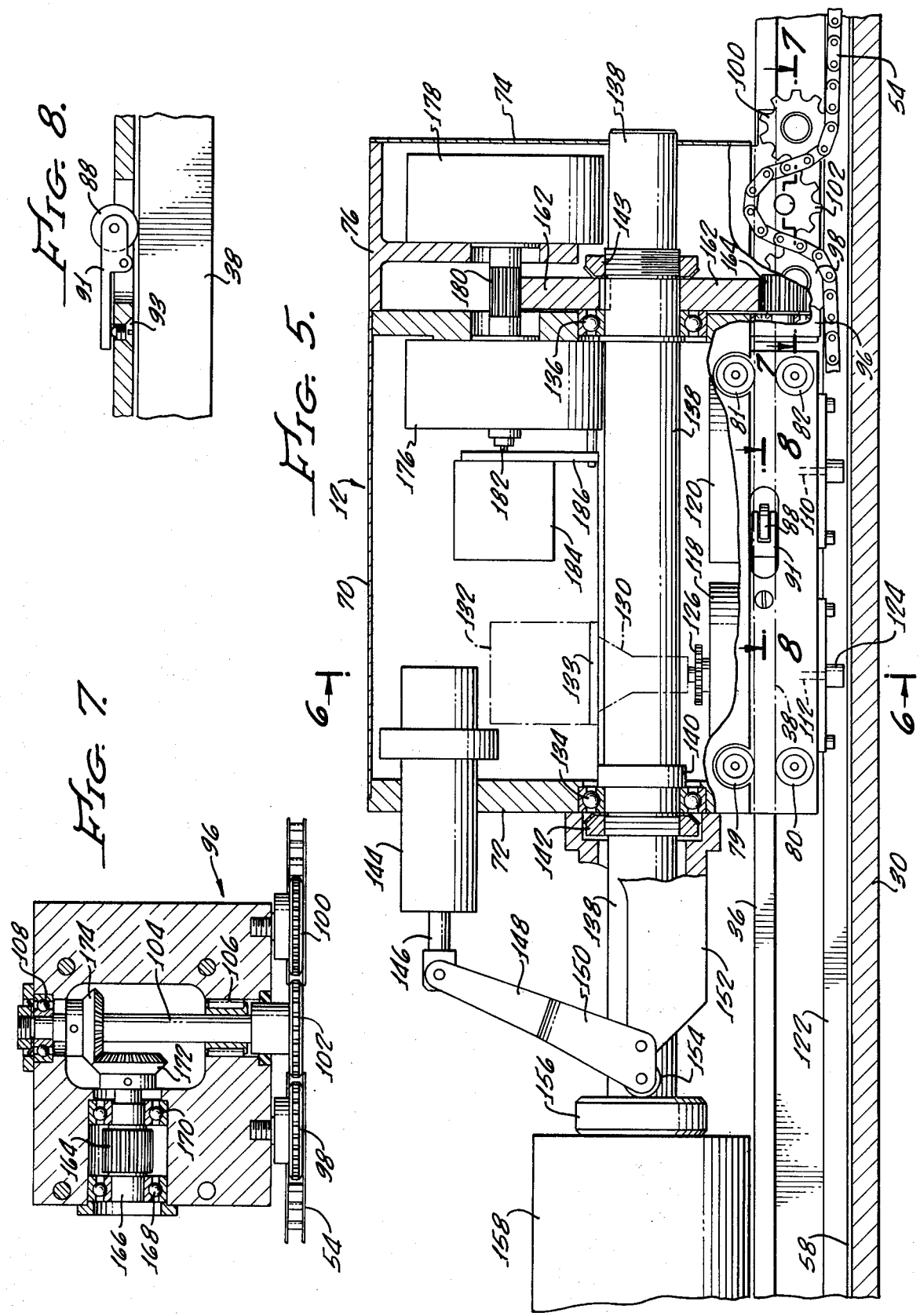

TUBE BENDING MACHINE AND CARRIAGE THEREFOR

This application is related to a copending application of Homer L. Eaton and Walter F. Felber for Positioning Servo and Controlled Mechanism, Ser. No. 567,287, Filed Apr. 11, 1975 which covers a control preferred for use with the present invention. The disclosure of such copending application is fully incorporated herein by this reference.

BACKGROUND OF THE INVENTION

A widely employed type of tube bending machine embodies an elongated machine bed at one end of which is mounted apparatus for achieving draw bending or press bending of the tube. A multiple bend tube commonly has a number of bends located at different points along the tube and having the planes of different bends angularly shifted about the tube axis. Other variables in the bending process, whether performed by a draw or press bending, include the degree of bend and the radius of the bend. The latter two variables commonly are handled by the bending head. The position of the bend along the axis of the tube and the angular position of the plane of bend are often handled by a mechanism which grasps the tube and advances it toward the bending head to position the point of bend at the proper location with respect to dies in the bending head. The tube grasping mechanism also rotates the tube relative to the bending head to attain a selected plane of bend. Such tube handling mechanism must be simple, reliable and accurate. It must be lightweight for a fast response time, particularly where a number of bends are to be made in rapid succession by a machine that is entirely automatically controlled. Thus, many bending machines in the past have embodied separate driving mechanisms for carriage travel and chuck rotation. Heavy, expensive, ball screw drives have been employed, and these often are provided in duplicate for the driving of the chuck and the driving of the carriage. In some arrangements, one or more heavy driving motors is carried by the carriage.

Precision ball screw drives for a machine having a typical ten-foot length of travel are massive and expensive. Where motors are mounted on the carriage, not only is the motor cost increased by use of plural motors, but the carriage and all supporting and driving structures must be stronger, heavier, more expensive, and more difficult to precisely and rapidly control. In some prior arrangements, one motor has been employed for two drives, but these have still required duplication of the driving connection between the motor and the several driven members.

Accordingly, it is an object of the present invention to provide a common drive for several driven members which eliminates or minimizes the above-described disadvantages.

SUMMARY OF THE INVENTION

In carrying out principles of the present invention in accordance with a preferred embodiment thereof, a drive member is coupled to drive first and second driven members and drive selector means is provided to selectively differentially restrain one or the other of the driven members to thereby relatively increase the response to the drive member of that one of the driven members under lesser restraint. In a particular example, the drive member is a sprocket driven by a remotely actuated endless chain and connected to drive either a carriage or a chuck rotatably mounted on the carriage. First and second braking means are provided to selectively restrain either motion of the carriage or rotation of the chuck so that motion of the chain and drive member may be imparted to the chuck when the carriage motion is restrained and to the carriage when chuck motion is restrained.

BRIEF DESCRIPTION OF THE DRAWINGS

FIG. 4 is a schematic illustration of functioning parts of the carriage and chuck drive mechanism;

FIG. 5 is a section taken on lines 5—5 of FIG. 3;

FIGS. 6, 7 and 8 are sections taken on lines 6—6, 7—7 and 8—8, respectively, of FIG. 5.

DETAILED DESCRIPTION

Figure 1:
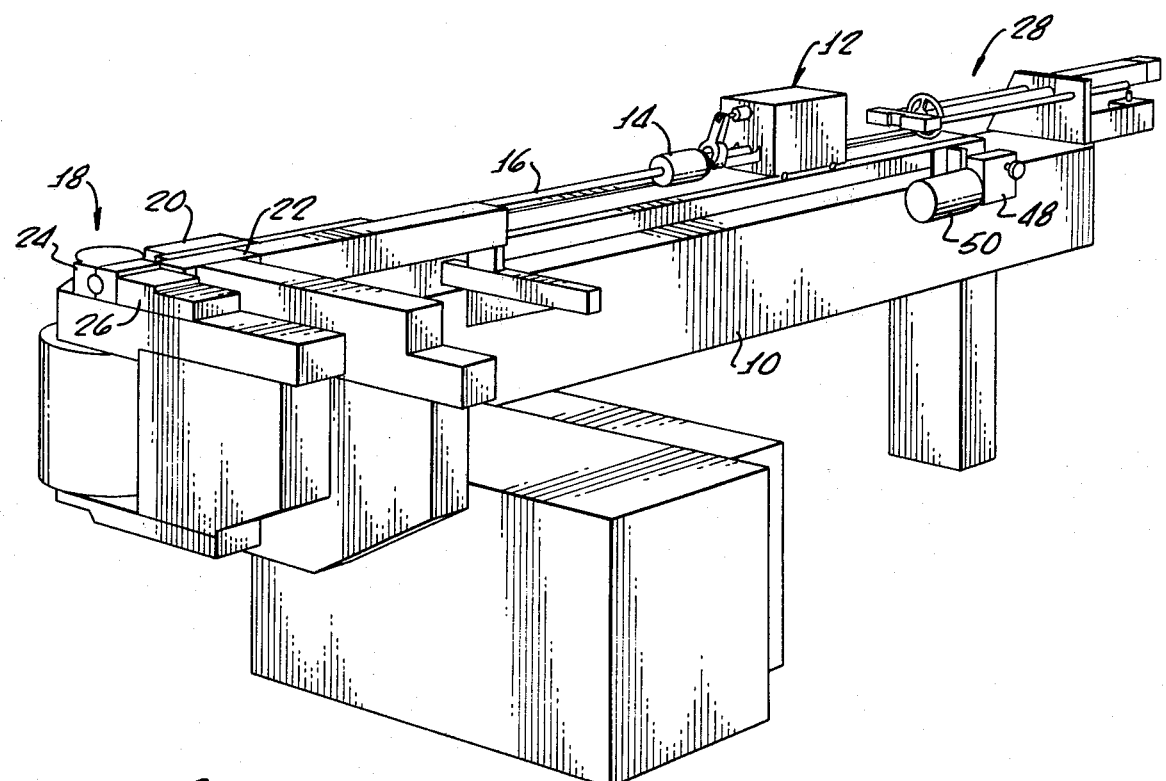
FIG. 1 is a perspective view of a tube bending machine embodying principles of the present invention.

Illustrated in FIG. 1 is a tube bending machine that is adapted for either automatic or manual control. The general function and operation of machines of this type are well known, typical machines being described in U.S. Pat. Nos. 3,821,425, 3,808,856, 3,557,585, 3,426,562, 3,352,136 and 3,156,287, among others. Briefly, the machine comprises a fixedly supported bed 10 having a moving carriage assembly 12 that carries a rotatable chuck 14. The latter grips a tube 16 which is to be advanced and rotated for pre-selected positioning with respect to dies carried by a machine bending head, generally indicated at 18. Principles of the present invention may be employed in bending machines using various types of bending, such as, for example, rotary, draw or press bending. Draw bending apparatus is schematically illustrated in FIG. 1, for purposes of exposition only, as including a press die 20, a wiper die 22, a rotatable die 24 and a clamp die 26 rotatable together with the bend die. Carriage assembly mounting and construction, and particularly, the drive therefor, embody principles of the present invention which will be described in further detail hereinafter.

For a bending operation, the carriage advances the tube 16 and the chuck rotates the tube for positioning with respect to the dies. The press and wiper dies 20, 22 clamp a portion of the tube behind the bend and both the clamp die and bend die are rotated about a substantially vertical axis, in the illustrated arrangement, to effect the bend. Thereafter, the dies are withdrawn from the tube, the carriage is advanced and the chuck rotated to properly position the tube both longitudinally and rotatably for the next bend. A conventional mandrel is inserted into the tube prior to each bend, properly positioned with respect to the area to be bent, and thereafter withdrawn by means of a substantially conventional mandril extracting mechanism 28 mounted at the rear of the bed 10.

Figure 3:
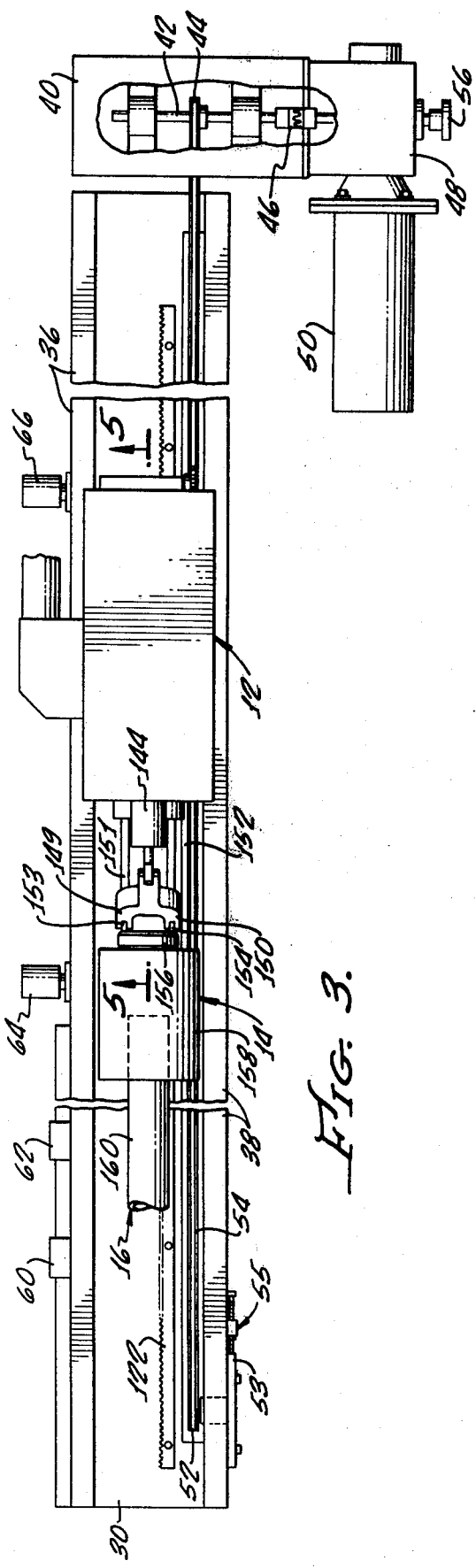
FIG. 3 is a top plan view of the carriage and bed of the machine of FIG. 1 with certain parts removed.
Figure 2:
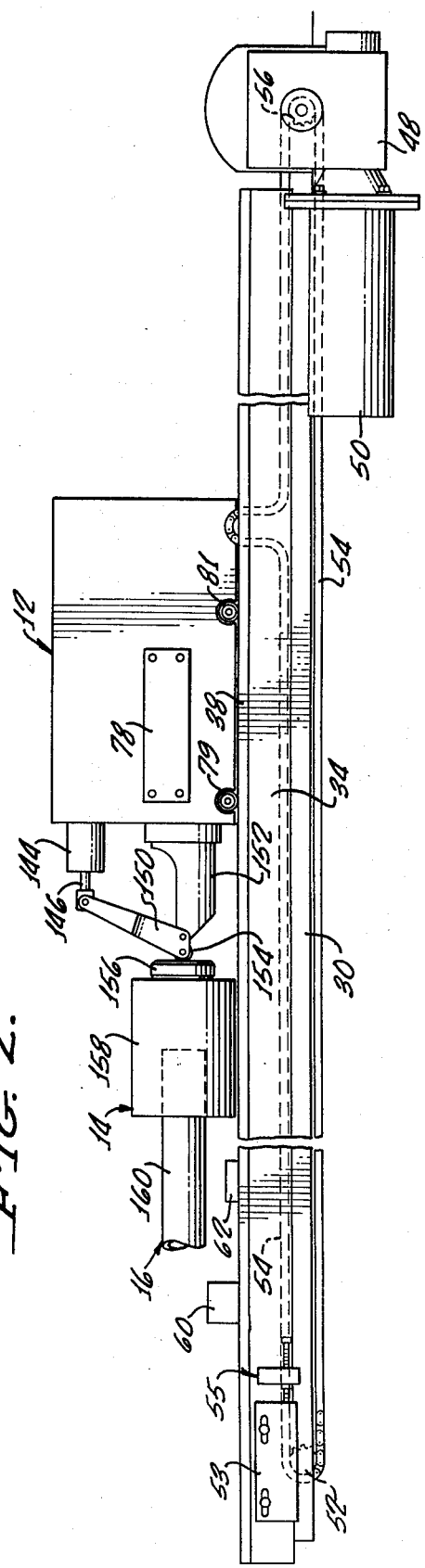
FIG. 2 is a side elevational view of the carriage and bed of the machine of FIG. 1 with certain machine parts removed.

In the illustrated embodiment of the present invention, the machine bed 10 carries a substantially U-shaped elongated rail assembly (FIGS. 2, 3 and 6) having a rigid substantially horizontal web 30, first and second upstanding sidewalls 32, 34, and oppositely disposed and inwardly projecting flanges 36, 38 that form rails or tracks for the carriage. A shaft housing 40 (FIG. 3) mounted at the rear of the machine bed rotatably carries a short carriage drive shaft 42 on which is pinned a carriage drive sprocket 44. Shaft 42, having a length only slightly greater than the width of the rail assembly, is driven via a carriage drive coupling clutch 46 and a gear box 48 from a reversible direct current motor 50 which, together with the gear box, is fixedly mounted upon the side of the machine bed. An idler sprocket 52 is journalled at a forward end of the wall 34 of the rail assembly and a carriage driving roller chain 54 is entrained in an endless loop over the idler sprocket 52 and the carriage drive sprocket 44. Idler sprocket 52 is movably mounted to the rail assembly by means of a sprocket adjustment bracket 53 that is adjustably positioned by a screw and nut arrangement 55 for adjusting chain tension. Carriage drive shaft 42 has a manually controllable clutch disengaging knob 56 that enables manual operation of the chain when motor 50 is decoupled from the drive shaft by pulling the knob outwardly. An elongated strip of chain bearing tape 58 (FIGS. 5 and 6) is fixed to the rail assembly web 30 directly beneath the upper run of chain 54 to minimize wear on the rail assembly and chain. A forward carriage stop 60 and a magnetic carriage position reference device 62 are mounted along the rail assembly track. Also mounted to the rail assembly are cable rollers or rotatable supports 64, 66 for movably supporting electrical wiring that connects various elements on the movable carriage to relatively fixed control apparatus.

CARRIAGE

Carriage assembly 12 (FIGS. 5 and 6) includes a carriage housing in the form of a casting 68 having a top cover 70, a front cover 72, and a rear cover 74. An upper gear cover 76 extends from top cover 70 to provide access to certain enclosed components. A side access cover 78 provides access to other parts contained within the carriage housing.

Figure 6:
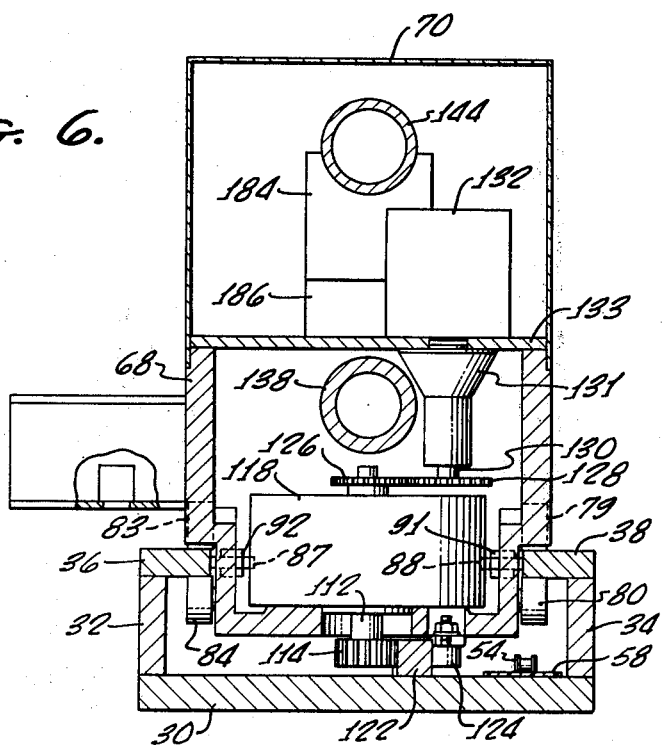

The carriage rotatably carries two pairs of mutually opposed and vertically spaced rollers 79, 80 and 81, 82 on one side and similar pairs of mutually opposed and vertically spaced rollers including those indicated at 83, 84 on the other side. As best seen in FIG. 6, the rollers of each pair are spaced apart by a distance just greater than the thickness of track members 36, 38 which are respectively interposed between rollers of pairs of rollers on either side of the carriage assembly. The carriage housing also carries a pair of side loading rollers 87, 88 which are mounted for rotation about a vertical axis in respective levers 91, 92. The side loading levers 91, 92 (FIG. 8) are pivotally urged to press the side loading rollers against the facing edges of the respective track members 36, 38 to enhance the stability of the roller mounting of the carriage upon the rail assembly. Adjustment of outward roller pressure is achieved by screws such as screw 93 which is threaded in the carriage and bears against lever 91.

A carriage drive gear box 96 (FIGS. 5 and 7), fixed to the underside of a rear portion of the carriage housing, rotatably mounts a drive sprocket assembly comprising first and second idler sprockets 98, 100 journalled upon mutually spaced parallel horizontal axes on either side of a carriage drive wheel or sprocket 102 that is pinned to a drive sprocket shaft 104 journalled in needle bearings 106 and ball bearings 108 carried by the carriage drive gear box 96. Roller chain 54 is entrained over drive sprocket 102, extending between the latter and the idler sprockets 98, 100, which thus help to hold the chain in operative engagement with the drive sprocket over nearly half the circumference thereof.

Rotatably journalled in the carriage housing about a vertical axis, are a pair of longitudinally spaced pinion shafts 110, 112, fixedly carrying at the lower ends thereof pinion gears 114, 116, respectively. The pinion shafts are fixed extensions of a pair of carriage distance brakes 118, 120, which are fixed to the carriage housing and capable of electrical operation to prevent rotation of the pinions and pinion shafts, as will be more particularly described hereinafter. Pinions 114, 116 engage a rack 122 (FIGS. 3 and 6) that is fixedly carried by rail assembly web 30 and extends for substantially the entire length of carriage travel. The pinions are held in firm operative engagement with the rack by means of a roller 124 rotatably carried at the bottom of the carriage housing and depending therefrom into engagement with the back surface of the rack 122. The brake or pinion shaft 112 carries a gear 126 at its upper end which engages with a gear 128 that is fixed to one end of an input shaft 130 of a carriage distance encoder 132. Encoder 132 is a conventional position pickoff transducer such as an ACCU-CODER, Model No. 716, manufactured by Encoder Products of Sandpoint, Idaho. The position transducer produces an electrical pulse for each increment of angular displacement of its input shaft, and accordingly, one output pulse for each increment of motion of the carriage along the rail assembly. Encoder input shaft 130 is journalled in a vertically extending encoder shaft housing 131 which is fixed to an encoder mounting plate 133 carried by the carriage housing sidewalls.

Journalled within the carriage housing on front and rear bearings 134 and 136, and extending horizontally through the carriage, is a rigid, hollow carriage shaft 138 that is locked against longitudinal motion relative to the carriage by means of a collar 140 fixed to the shaft 138 and bearing lock nuts 142 and 143. An hydraulic cylinder 144 powers a cylinder rod 146 that is pinned to a collet lever 148 having bifurcated arms 149, 150. The arms 149, 150 are respectively pivoted on arms 151, 152 (FIG 3) of a collet lever bracket that is fixed to the front of the carriage housing. Lever arms 149 and 150 carry rollers 153, 154 that bear against an axially shiftable thrust bearing 156 mounted upon the carriage shaft 138. Threaded upon the forward end of the rotatable carriage shaft 138 is a conventional chuck assembly 158 having a radially contractable arbor adapted to be inserted over a tube carried by the chuck and contracted by movement of the thrust bearing from an open position to a tube locking position. Although many different types of remotely operable chucks are known and may be employed, in a preferred embodiment of the invention the chuck comprises a Jacobs rubberflex collet chuck having inner and outer cylindrical members with interfitting tapers such that forward motion of thrust bearing 156 will drive the outer chuck cylinder forwardly (to the left in FIG. 5) and force the contractable inner cylinder to be radially inwardly compressed to grasp an end of the tube inserted therein.

Keyed to the carriage shaft 138 is a chuck rotation power gear 162 (FIG. 5) that engages a pinion gear 164 fixedly carried on a stem pinion shaft 166 (FIG. 7) that is journalled in the carriage drive gear box by means of bearings 168, 170. Stem pinion shaft 166 fixedly carries, at its inner end, a mitre gear 172 which meshes with a mitre gear 174 fixed to the drive sprocket shaft 104.

Fixedly mounted on the carriage housing are first and second chuck rotation brakes 176, 178 (FIG. 5) having coaxial horizontally extending input shafts which are fixed in common to a pinion gear 180 that meshes with the chuck rotation power gear 162. One end of the input shaft of brake 176 is connected to an input shaft 182 of a rotation encoder 184 fixedly carried upon an encoder mounting plate 186 which itself is mounted to and carried by rotation brake 176. Encoder 184 is identical to encoder 132 and provides a position pick-off transducer that signals rotation position (actually incremental changes of angle in the described embodiment) of the carriage shaft, chuck, and tube carried thereby. All of the four brakes, the chuck rotation brakes 176, 178 and the two carriage distance brakes 118, 120, are identical. For purposes of the mechanical drive selection of either chuck rotation or carriage motion, as described more particularly below, the brakes may be of any type, including those operable only between fully "on" and fully "off" conditions. Nevertheless, for precision positioning, the brakes are of the type that are electrically operated to provide a variable proportional braking torque. The braking torque applied is directly proportional to the magnitude of an electrical brake driving signal that is applied to the brake. Proportionally operable electro-magnetic brakes such as the SOFSTEP brake, Part No. 97570-190, made by Lear-Siegler Corp., are exemplary of those that are preferred in practice of this invention.

MECHANICAL OPERATION

Initially a tube to be bent is manually inserted in the chuck and chuck operating cylinder 144 is actuated to lock the chuck upon the tube. With the tube grasped in a chuck, the carriage is then moved until it abuts the carriage stop block 60 which thus provides a reference for the carriage position and for zeroing position command registers, where employed. The carriage is then moved rearwardly and bending operations may be commenced. Upon commencement of the bending, the carriage is moved to the first commanded position. No chuck rotation is required for the first bend since the first bend may be made in the initially chosen rotational orientation of the tube. A suitable mandril is inserted through the carriage shaft, through the tube that is grasped in the chuck, and into and through a portion of the tube that lies at the machine bending head. The bending head dies are operated to grasp and bend the tube during which time the carriage and rotation brakes are de-energized. The carriage brakes are de-energized during the draw bending since this bending operation will operate to pull the tube toward and along the bending die as the bend is made, drawing the carriage assembly along with the tube. Having made the first bend, the dies are moved to release the tube, the chuck brakes are locked and the carriage assembly advanced to the position the tube at the point of next bend. The carriage brakes are now locked and the chuck is rotated to a predetermined angular position as determined by the plane of the next bend and the commanded angular position. The dies are then operated to again grasp the tube rearwardly of the bend die. The carriage and chuck brakes are released and the next bend is completed. The described sequences may be carried out by hand if necessary or desirable or may be entirely automatically programmed by methods and apparatus well known in the art.

A schematic mechanical structure is illustrated in FIG. 4 to facilitate understanding of the selective drive operation. The arrangement enables the tension member, chain 54, to operate via a selective coupling means (which includes the brakes) to selectively cause the tension member to move (a) the carriage along the track, (b) the chuck about its rotation axis, or (c) both of (a) and (b). Nevertheless, for operation of the described bending machine, it is not necessary to drive both carriage and chuck at the same time.

For driving of the carriage assembly along the rail assembly, chuck rotation brakes 176 and 178 are energized to lock gear 180 and rotation power gear 162, and thus lock the drive sprocket 102 against rotation with respect to the carriage. With the rotation brake and drive sprocket 102 locked, chain drive sprocket 44 may be rotated by operation of motor 50 or by hand (directly grasping and pulling the tube 16 or the carriage assembly) when the motor is disconnected by means of disengagement of clutch 46. Thus, chain 54 is driven but cannot rotate the locked carriage drive sprocket 102. Accordingly, the entire carriage assembly is moved along with the chain relative to the rail assembly. As the carriage moves along the rail assembly, pinions 114, 116 are moved relative to the rack 122 and thereby rotated to operate distance pickoff 132. Th latter provides an output signal in the form of a train of electrical pulses representing increments of carriage travel. Distance brakes 118 and 120 are not energized at this time but may be energized when the carriage approaches a desired position as more particularly described below in connection with the description of the position servo. Nevertheless, for the purpose of mechanical drive selection of carriage motion, brakes 176, 178 are fully energized and brakes 118, 120 are de-energized except as employed to stop carriage motion.

When the carriage has attained its desired position, the carriage may be locked and a tube gripped in the chuck 158 is rotated so as to provide a selected plane of bend. Thus, distance brakes 118 and 120 are fully energized to lock pinions 114 and 116 and prevent motion of the carriage along the rail assembly. Chuck rotation brakes 176 and 178 are de-energized, whereby rotation of the chain drive sprocket 44 by motor 50 will again drive the endless chain 54. Now however, because brakes 176, 178 are de-energized, and brakes 118, 120 are energized, the carriage drive sprocket 102 will rotate in its bearings relative to the carriage housing. Rotation of sprocket 102 drives gears 174, 172 and 164 to thereby drive chuck rotation power gear 162. Accordingly, the carriage shaft 138 is rotated to rotate chuck 158 and a tube 16 grasped thereby. Rotation of power gear 162 drives pinion 180 to thereby drive the input shafts of both brakes 176 and 178 and also to drive the input shaft of pickoff 184. The latter, accordingly, provides an output signal representing increments of chuck rotation.

Thus, it will be seen that one drive member, chain drive sprocket 44, is coupled to drive either the chuck 158 or the entire carriage assembly, and the brakes comprise a selector arrangement for selectively differentially restraining chuck rotation and carriage motion (as by braking one and not braking the other, for example). When the two members (carriage assembly and chuck) are differentially restrained, the response to drive member 44 of that one of the driven members having the lesser restraint is increased. Although both the carriage motion and chuck rotaton may be achieved simultaneously in relatively differing amounts according to the degree of energization of the respective brakes, in the described bending machine, the two motions, the carriage motion and chuck rotaton take place alternatively. That is, chuck rotation is prevented while the carriage is moving and carriage motion is prevented while the chuck is rotated. When the tube is grasped by the bending dies, both sets of brakes are de-energized.

POSITION CONTROL

Position control of the apparatus, that is, control of both the actual positioning of the carriage along the rail assembly and of the rotation of the chuck, is achieved by means of a unique braking control circuit that operates regardless of the nature of the drive imparted to the carriage or chuck. It will be recalled that the carriage and chuck may be driven from the motor 50 via the drive chain and connected mechanism. Alternatively, by disengaging the motor by operation of clutch 46, the carriage and chuck may be moved manually, for example, by grasping a tube clamped in the chuck and pulling the assembly to a selected position or by rotating the tube and thus the chuck to a desired position of angular rotation. Further, because of the considerable slack in a long chain, the carriage or chuck may be moving solely under the influence of its own momentum when the motor is connected to drive the mechanism but has been rapidly slowed so that carriage or chuck velocity is greater than the desired motor velocity. Therefore, regardless of the nature of the driving force, whether motor dirve, momentum or manual, once a desired position (a point along the rail or a desired angular displacement) has been set into the apparatus, the positioning control will positively and precisely stop the carriage motion or the chuck rotation, as the case may be, upon attaining the selected positioning.

Uniquely, the very same braking mechanism employed for selection of carriage or chuck drive is employed for the precise position control. Thus, when driving the carriage, the chuck brakes are tightly locked. The carriage brakes, which are initially de-energized to allow rapid position approach, are selectively energized. Conversely, when rotating the chuck, the carriage brakes are continuously locked and the chuck brakes are selectively energized as the desired rotational chuck position is approached.

Briefly, a position error is generated that indicates the distance (linear or angular) between a position to which the carriage or chuck is to be moved and the actual position of the chuck or carriage, respectively. The controlling brake (the carriage brake when carriage motion is being controlled and the chuck brake when chuck motion is being controlled) is then energized in response to the position error signal and an actual velocity signal. The brake is caused to apply a braking force that is substantially proportional to the difference between the actual velocity signal and the position error signal.

Figure 9:
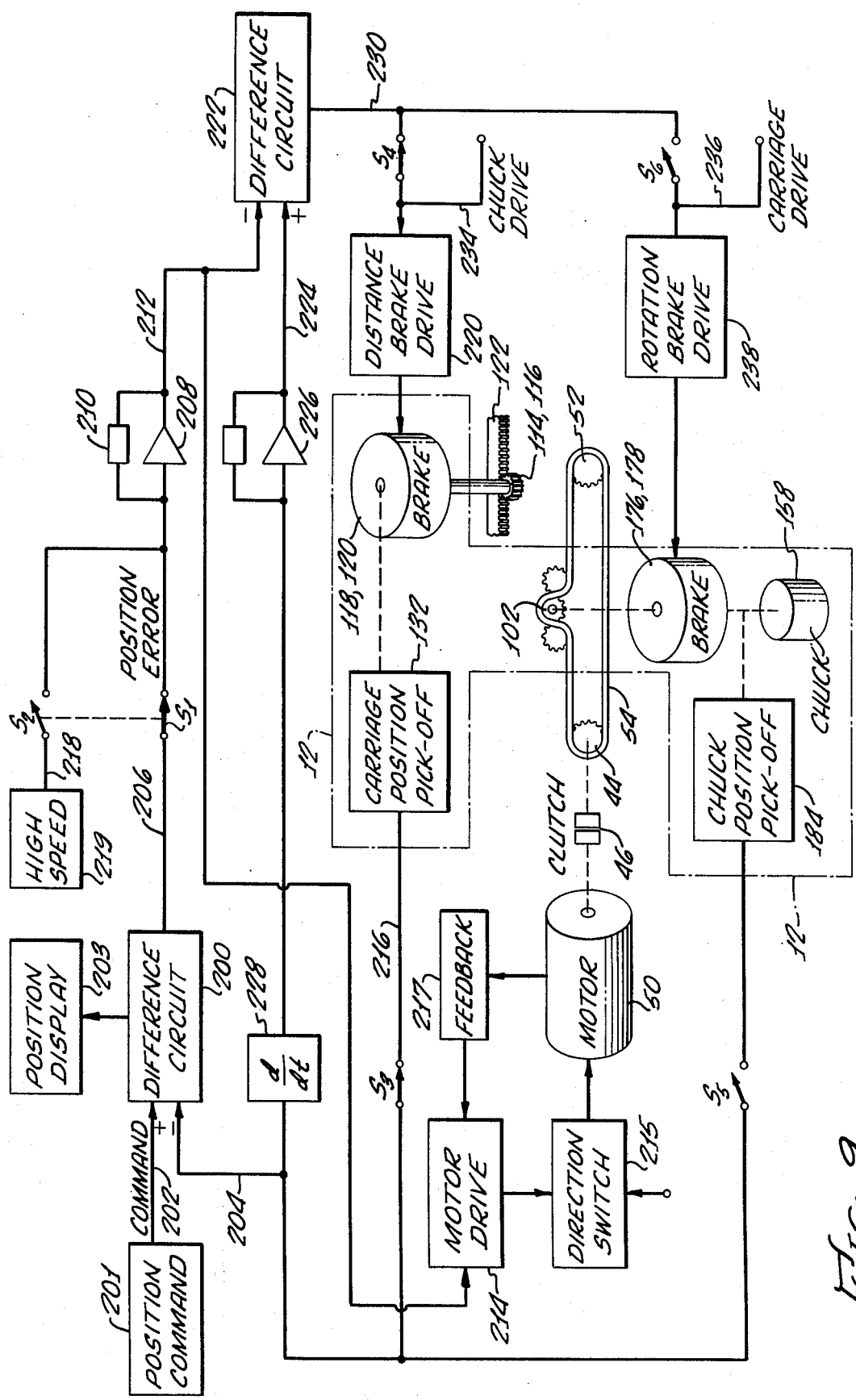
FIG. 9 illustrates a servo positioning system applied in a multiplexing operation to drive both the chuck and carriage.

Illustrated in FIG. 9 is a block diagram of the novel positioning system, made up of conventional components, and employed in a time sharing arrangement for control of both carriage and chuck position. Control of both carriage and chuck position are substantially identical and we shall first consider carriage position control.

A difference circuit 200 receives from a source 201 of position command a first input in the form of a command signal on a line 202 that represents a position to which the carriage is to be driven. The difference circuit receives as a second input on line 204 a feedback signal representing the actual position of the driven member, the carriage in this case. It may be noted that the control system can be mechanized either by means of standard commonly available analog or digital components, as is well known in the art. Where a digital mechanization is employed, the difference circuit is preferably a digital storage register into which a commanded position number is inserted, either automatically, from the output of a computer, or manually by operator control of buttons on an input console, as generally represented by the position command source 201. In such a digital arrangement, the feedback signal representing acutal position of line 24 is a series of pulses, each of which represents an increment of travel and each of which decreases the commanded position number stored in the circuit or stroage register 200 by a single bit or unit of distance. Accordingly, an output of the difference circuit on a line 206 is a position error signal proportional to the distance between actual and commanded position. This error, together with the commanded position, are displayed in position display 203 for monitoring of the operation.

The position error signal on line 206 is fed via a switch $S_1$ to an operational amplifier 208 having an adjustable gain controlling feedback circuit 210. In a digital mechanization, a digital to analog converter (not shown) is interposed between the output of the difference circuit and the input of the amplifier 208. Gain of amplifier 208 is adjusted so that its output, on a line 212, is a DC volage having a magnitude that is directly proportional to a desired motor speed. This motor speed signal on line 212 is fed to a conventional motor drive cirucit 214 that provides a driving voltage via a motor direction switch 215 for the DC motor 50 previously described. A standard motor velocity feedback 217 is provided such that motor 50 is driven at a speed precisely proportional to the position error voltage on line 212 and in a direction determined by the state of switch 215.

With the clutch 46 engaged, the motor rotates chain drive sprocket 44 to thereby pull the chain 54 along the rail assembly. Because the carriage is now being controlled, chuck brakes 176, 178 are fully energized to lock the carriage drive sprocket 102 against rotation to thereby pull the entire carriage assembly with the chain along the rails. Carriage brakes 118, 120, at this time, are de-energized. The carriage assembly is indicated in FIG. 9 by a box 12, depicted in phantom lines.

As the carriage travels along the rail assembly, the carriage position pickoff 132 provides a position feedback signal on line 216 which is fed via a multiplexing switch $S_3$ to the second or feedback input of difference circuit 200.

To enhance the speed of motor driven approach to the desired position, the carriage initially driven at high speed from a steady state, fixed voltage provided on an input line 218 from a high speed central source 219 and fed to amplifier 208 via switch $S_2$. Thus, switch $S_2$, between line 218 and the input of amplifier 208, is initially closed and the corresponding switch S₁, ganged with switch S₂, is initially open, whereby a relatively high level steady state signal is applied to drive the motor at a constant high speed. When the distance between the desired position and the actual position of the carriage has decreased to a preselected value, such as four inches, for example, switches S₁ and S₂ are simultaneously operated to open S₂ and close S₁, thereby to place the motor under control of the decreasing position error signal provided from the difference circuit 200. The operation of ganged switches S₁ and S₂ may be achieved either manually, by an operator monitoring the operation, or automatically by conventional circuit logic which monitors the position error and provides a switch operating signal when the position error decreases to a value representing the desired distance at which proportional braking operation is to be initiated.

It will be observed that the arrangement described to this point is basically a conventional motor driving servo in which a motor is operated at a rate or velocity proportional to a sensed position error. However, it will be also observed that particularly because of the long, compliant tension drive of the carriage, changes in velocity of the carriage will not precisely follow changes in velocity of the driving motor 50. As the carriage approaches the desired position, the motor 50 is caused to slow down in proportion to the decreasing position error. Decreasing velocity of the motor causes a decreasing pull upon the tension connecting member, but momentum of the carriage causes the latter to continue at a relatively higher velocity. Thus, the lagging of velocity changes of the driven carriage, with respect to velocity changes of the driving motor, is greatly enhanced because of compliance of the connecting chain.

For precise positoning, a restraining force is applied to the carriage to cause its velocity to more closely follow the velocity of the driving motor and, further to ensure that the carriage will stop precisely at the commanded position (which is represented by the signal on command input line 202). To this end, the carriage brakes 118, 120 are driven by a distance brake drive circuit 220 that is energized via a multiplexing switch S₄ from the output of a second or brake control difference circuit 222. A first input to circuit 222 is provided from line 212 at the output of the speed adjusting amplifier 208. This first input to the brake control difference circuit 222, as previously mentioned, is directly proportional to the position error of the carriage. A second input to the difference circuit 222 is provided on a line 224 in the form of an actual velocity signal, a signal that is proportional to the actual velocity of the carriage. The velocity signal is provided from the output of a high gain operational amplifier 226 which, in turn, receives as its input the outpt of a circuit 228 which effectively differentiates the carriage position pickoff signal on line 216.

In an analog system, circuit 228 may be a conventional analog differentiating circuit such as a resistance capacitor circuit or other differentiating circuit. In a digital arrangement, where the carriage position pickoff signal is a series of pulses each representing an increment of distance travelled, circuit 228 may simply provide an output signal porportional to the time interval between pulses or the time required for occurrence of a selected number of such position pickoff pulses, which is, of course, directly proportional to the rate of change of position (e.g. velocity). The circuit 228 provides a convenient way to obtain velocity information from the same transducer 132 that measures position. Obviously, a second transducer, directly generating a velocity signal, may be employed alternatively.

Difference circuit 222 is a conventional resistive summing circuit, receiving an input of first polarity from amplifier 208 and an input of opposite polarity from amplifier 226 whereby the output of the difference circuit, on a line 230, is a brake control error signal that is proportional to the difference between actual velocity of the carriage and the carriage position error, such carriage position error itself being directly proportional to the commanded motor velocity. The brake control error signal on line 230 is fed via a multiplexing switch S₄ and distance brake drive circuit 220 to energize both distance brakes 118, 120. These brakes, therefore, are caused to exert a braking torque that is directly proportional to the magnitude of the distance brake control error signal. During carriage drive selection, there is no signal on a second input line 234, which is employed only for chuck drive selection.

Various types of controllably energized brakes may be employed. In a preferred embodiment, all of the brakes, both distance brakes and both chuck brakes are of the type described above. These are magnetic particle brakes which are electrically operated to exert a braking force directly proportional to the magnitude of the applied signal. When the distance brakes are energized, pinions 114, 116 retard the carriage motion by their engagement with the fixed rack 122.

With the described brake control of carriage position, the distance brakes are energized only when the signal on line 224 is greater than the signal on line 212. When the signal on line 212 is greater, the brakes exert no retarding force on the carriage. As motor speed decreases and carriage speed decreases at a lesser rate, there is a velocity error equal to the difference between commanded motor velocity and actual carriage velocity. This velocity error is also proportional to the difference between the position error and the actual carriage velocity. A brake control error signal proportional to this velocity error (and proportional to the difference between actual velocity and position error) is applied to the brakes and thus a braking force is applied having a magnitude in direct proportion to the velocity error. As the velocity error decreases, the retarding force applied by the brake decreases. As the carriage approaches a position at or substantially at the desired position, as defined by the command signal on line 202, the position error becomes zero or very small. It may be noted that the gain of the closed loop brake controlling circuit, particularly as defined by the gain of amplifier 226, is quite high and considerably greater than the gain of the rate servo drive of motor 50. Accordingly, even a small actual velocity of the carriage, when the latter is at or near its commanded position (and position error is zero or very small), will result in a relatively large brake control error signal and thus cause a large braking force, whereby to ensure stopping of the carriage precisely at the commanded position.

The operation of the two servo systems for carriage control, the motor driving servo system and the position controlling closed loop brake servo system, have been described in a situation where the carriage is driven by the motor. As previously noted, the position controlling brake servo will operate regardless of the nature of the carriage drive. Thus, with clutch 46 disengaged, the motor may still be driven as previously described by means of the position error signal on line 212, but such motor drive has no effect upon the chain or carriage. Nevertheless, a desired position may still be inserted into the difference circuit 200 via line 202 and the carriage position pickoff 132 will still operate to enable the difference circuit and amplifier 208 to provide the above-described position error on line 212 (to drive the motor but not the chain 54 or carriage). Now with the motor and gear box 48 disconnected, the carriage may be moved by hand. One may simply push the carriage along or grasp the tube locked in the carriage chuck and pull the entire assembly toward the position defined by the command position that has been inserted into difference circuit 200. In this mode of operation, the closed loop brake control will operate just as previously described in connection with the driving of the carriage by the motor. It will stop the carriage precisely at the commanded position. The brake control loop depends only upon position error and actual carriage velocity, as sensed by pickoff 130 and velocity generating differentiating circuit 228. Whether or not the position error is employed to provide a driving force for the carriage has no effect upon the operation of the brake controlling circuit.

When the chuck is being driven, the carriage is locked in position. In this mode, multiplexing switches $S_3$ and $S_4$ are opened to disconnect the carriage position pickoff and to disable the connection between the distance brake drive and the difference circuit 222. At such time, a chuck drive signal is applied on a line 234 to the distance brake drive to fully energize the distance brakes and thus maintain the carriage locked in position when chuck drive is selected. As described above, when the distance brakes 118, 120 are not employed for mechanical selection of chuck rotation, these very same distance brakes are employed for precise carriage positioning as part of the brake control servo. Similarly, when the chuck rotation brakes 176, 178 are not employed for mechanical selection of carriage motion, they are employed for precise chuck positioning as part of the chuck brake control servo. Thus, for chuck rotation, multiplexor switches $S_3$ and $S_4$ are both opened and corresponding multiplexor switches $S_5$ and $S_6$ in the chuck brake control loop are closed. For both chuck rotation and carriage position a number of the circuit elements are employed in common, including difference circuit 200, switches $S_1$ and $S_2$, amplifier 208, difference circuit 222, amplifier 226, velocity circuit 228, motor drive circuit 214, 215 and motor 50, together with the mechanical driving components.

For chuck rotation, the position command on line 202 represents a desired angular position, expressed in degrees of rotation. Initially, switch $S_1$ is open and switch $S_2$ is closed to feed a high level motor drive signal to amplifier 208 and thence, via motor drive 214, 215, to the motor 50. With clutch 46 engaged, the motor drives chain drive sprocket 44, chain 54, and carriage drive sprocket 102. The carriage motion is now prevented because distance brake drive 220 receives a high level chuck drive signal on line 234 to fully energize the distance brakes 118, 120. Accordingly, sprocket 102 rotates on its journals in the carriage and, by mechanism previously described, rotates chuck 158. Chuck position pickoff 184, which is identical to the carriage position pickoff, provides a train of output pulses each of which represents an increment of chuck rotation. This chuck position signal is fed via closed switch $S_5$ to the second input of difference circuit 200. The latter provides at its output 206 a position error directly proportional to the angular distance between the desired position of chuck rotation and the actual position of the chuck rotation. When this position error decreases to a predetermined angle, such as 40°, for example, switches $S_2$ and $S_1$ are operated to disconnect line 218 and connect the position error on line 206 to the input of amplifier 208, whereby motor 50 is now controlled in a conventional servo loop to be driven at a speed directly proportional to the computed chuck angular position error.

The chuck position pickoff signal is also fed to the velocity circuit 228 which provides an output signal that is now indicative of the actual rotational velocity of the chuck. This velocity indicating output signal, fed via high gain amplifier 226, provides one input to the brake control difference circuit 222 which has as its other input the chuck angular position error signal on line 212. A rotation brake error signal is now fed to a rotation brake drive circuit 238 which operates as previously described in connection with operation of the carriage distance brakes. Circuit 238 energizes the chuck rotation brakes 176 and 178 to cause these to apply a braking torque proportional to the rotation brake error signal. For selection of carriage drive a carriage drive signal on a line 236 energizes the rotation brake drive 238 to fully energize the rotation brakes to prevent rotation of drive sprocket 102. However, no signal is applied on line 236 when chuck drive is selected.

The chuck braking loop operates in the same manner as the carriage braking loop and tends to decrease the difference between chuck rotational velocity and chuck position error (commanded motor velocity). In a manner similar to that described above, the chuck position error is substantially zero when the chuck is at or nearly at its desired position, wherefor a strong braking force is applied to the chuck power gear 162 if there should still be any chuck velocity remaining.

Again, this position control will operate when the chuck is being rotated from motor 50, clutch 46 and chain 54, and also will operate when the clutch 46 is disengaged and the chuck is rotated manually, as by rotating a tube held in the chuck. For manual rotation of the chuck clutch 46 is disengaged. One manually rotates the chuck, the carriage shaft, and the carriage drive sprocket 102 together with chain 54 and its sprockets 44 and 52, but the motor and gearing within gear box 48 is not moved. Similarly, when moving the carriage assembly by hand with chuck brakes 176, 178 locked, carriage drive sprocket 102 is locked to the chain and draws this along its path of travel about sprockets 44, 52, but the motor and its gear box remain at rest.

A significant aspect of the described positioning servo, is the fact that the brakes of the servo loop are only energized (for servo purposes) in response to carriage (or chuck) velocity and position error. Further, the brakes are always energized (when brake servo control is employed) from a simple brake control difference circuit 222. A comparison is made between the distance of the driven member from the desired position and its actual velocity and the brakes are energized in proportion to this difference. Thus, when position error is large (the driven member is relatively far from its desired position) its velocity also may be large without calling for any braking, which would be inefficient at large position errors. On the other hand, as the driven member approaches its desired position, the brake control servo monitors velocity and enforces a concommittantly decreasing speed.

It is not desirable (nor necessary with the described brake control servo) to calculate a predetermined braking distance because this distance will vary according to repeatability of braking forces, mass of the driven member (which varies with different diameter and lengths of tube) wear of the parts, and the like. The present arrangement simply computes the difference between the specified quantities and applies a proportional braking force. Not only is the brake control servo itself of unusual simplicity and effect, but it is directly adapted for use in combination with a conventional servo motor drive system and actually employs as one of its inputs the position error of such a conventional servo motor drive system. This feature facilitates operation of the braking servo while the motor continues to drive. It is not necessary to disconnect the driving force, and thus the possibility of stopping the driven member before it reaches its desired position is avoided.

The unique selective drive of two driven members from a single chain enables an extremely lightweight, yet sturdy, precise and reliable moving mechanism that lends itself to inexpensive manufacture and efficient manual or automatic control. The two sets of brakes, distance brakes 118, 120, and chuck brakes 176, 178, are provided primarily for the purpose of selecting one or the other of the chuck and carriage to be driven by the chain. Yet, these same brakes, when not being used for drive selection are available and are employed for precise positioning of the massive driven member, and help to overcome positioning problems (lagging velocity) introduced by other parts (the compliant chain) of the basic dual selective drive mechanism of which the brakes are an important part.

The foregoing detailed description is to be clearly understood as given by way of illustration and example only, the spirit and scope of this invention being limited solely by the appended claims.

What is claimed is:

1. A bending machine comprising
    a machine body, bending head means mounted adjacent said body for bending an elongated workpiece presented thereto,
    and
    means for presenting an elongated workpiece to the bending head means at selected axial and rotational positions of the workpiece, said means for presenting comprising
    a track mounted on the machine body,
    a carriage movable on the track,
    rotatable chuck means journalled on the carriage for grasping and axially rotating a workpiece for presentation to the bending head means,
    a driven, flexible tension element mounted on said body, and
    drive means coupled with said tension element for independently rotating said chuck means or moving said carriage along said track.

2. The bending machine of claim 1 wherein said drive means comprises a drive member movably mounted on the carriage, first and second coupling means for moving the chuck means and the carriage respectively in response to motion of the drive member, said drive member being connected in driving relation to said tension member for motion in response to said tension member as the latter is driven, and drive selector means for selectively differentially restraining motion of said chuck means and carriage.

3. The machine of claim 2 wherein said drive member comprises a drive wheel journalled on said carriage, and wherein said first coupling means comprises power gear means journalled on said carriage and connected with said chuck, and means on said carriage for rotating said power gear means in response to rotation of said drive wheel.

4. The machine of claim 3 wherein said second coupling means comprises said drive wheel and its journal on said carriage together with means for restraining rotation of said drive wheel.

5. The machine of claim 2 wherein said drive selector means comprises first brake means for resisting motion of said carriage relative to said brake and second brake means for resisting rotation of said chuck.

6. The machine of claim 2 wherein said drive member comprises a drive wheel journalled on said carriage and wherein said drive selector means includes a rack fixed to said track, a pinion journalled on said carriage and meshing with said rack, and brake means for resisting rotation of said pinion.

7. A dual drive comprising
    a track,
    a carriage mounted for motion along the track,
    a driven member movably mounted on the carriage,
    a drive member rotatably mounted on the carriage,
    an elongated tension member mounted along said track and entrained over said drive member,
    means for driving said tension member to thereby move said drive member, and
    means responsive to motion of said drive member for selectively moving (a) said carriage along said track or (b) said driven member relative to said carriage.

8. The apparatus of claim 7 wherein said last-mentioned means comprises first braking means for braking rotation of said drive member and second braking means for braking motion of said carriage along said track.

9. Remotely operable dual driving apparatus comprising
    a track,
    a carriage movable along said track,
    a drive wheel journalled on the carriage,
    a chuck journalled on the carriage,
    means interconnected between the drive wheel and the chuck for rotating the chuck in response to rotation of the drive wheel,
    means for selectively restraining rotation of the drive wheel,
    means connected with the drive wheel for moving said carriage along the track,
    means for selectively restraining motion of the carriage along said track,
    an elongated tension member in driving engagement with said drive wheel, and
    means for moving said elongated tension member along said track.

10. The apparatus of claim 9 wherein said means for moving the carriage along the track comprises said drive wheel, said tension member and said means for restraining rotation of said drive wheel, whereby said carriage will move along the track together with said tension member when said restraining means is actuated to restrain motion of said drive wheel relative to said carriage.

11. The apparatus of claim 10 wherein said means for restraining motion of said carriage comprises a rack fixed with respect to said track, a gear enmeshed with said rack and journalled upon said carriage, and braking means for restraining motion of said gear.

12. The apparatus of claim 11 including means for holding said tension member in contact with said drive wheel over nearly half of the circumference of said drive wheel.

13. Dual driving apparatus comprising
a carriage mounted for motion along a path,
a driven member mounted on said carriage for motion relative to the carriage,
a tension member,
means for pulling said tension member, and selective coupling means for selectively causing said tension member to pull said carriage or to move said driven member relative to said carriage.

14. The apparatus of claim 13 wherein said selective coupling means comprises a drive wheel journalled on said carriage and engaged in driven relation with said tension member, means for moving said driven member in response to rotation of said drive wheel, and means for effecting mutually independent restraint of motion of said drive wheel relative to said carriage and motion of said carriage along said path.

15. The apparatus of claim 14 wherein said means for effecting mutually independent restraint comprises first and second mutually independent braking means for independently braking said drive wheel and said carriage, respectively.

16. Dual driving apparatus comprising
a drive member,
first and second driven members,
first and second coupling means for driving said driven members respectively in response to said drive member,
means for driving said drive member, and
drive selector means for selectively differentially restraining said driven members to thereby relatively increase the response to said drive member of that one of said driven members under lesser restraint.

17. The apparatus of claim 16 wherein said drive selector means comprises first and second braking means for selectively restraining motion of said first and second driven members, respectively.

18. Dual driving apparatus comprising
a drive member,
first and second driven members,
first and second coupling means for driving said driven members respectively in response to said drive member,
means for driving said drive member, and
drive selector means for selectively differentially restraining said driven members to thereby relatively increase the response to said drive member of that one of said driven members under lesser restraint,
said drive selector means comprising first and second braking means for selectively restraining motion of said first and second driven members, respectively, said first driven member comprising a carriage, said drive member and said second driven member being rotatably mounted upon said carriage, said first braking means comprising means for restraining motion of said carriage.

19. The apparatus of claim 18 wherein said means for driving said drive member comprises a tension member connected in driving relation to said drive member, and wherein said second braking means includes means for restraining rotation of said drive member relative to said carriage, whereby motion of said tension member is transmitted to said carriage when rotation of said drive member relative to said carriage is restrained by said second braking means, and whereby motion of said tension member is transmitted via said drive member to said second driven member when motion of said carriage is restrained by said first braking means.

20. In a bending machine having a body and a bending head connected with the body for bending an elongated workpiece presented to the bending head at selected axial and rotational positions of the workpiece, improved apparatus for presenting the workpiece to the bending head comprising
a track mounted on the machine body,
a carriage mounted for motion along said track,
a work holding chuck rotatably mounted upon said carriage,
a drive sprocket journalled on the carriage,
motion transmitting means interconnected between the chuck and the drive sprocket for rotating the chuck in response to rotation of the sprocket,
first brake means mounted on the carriage for selectively resisting rotation of the drive sprocket,
second brake means mounted on the carriage for selectively resisting motion of the carriage along the track,
a drive chain movably mounted upon the track and engaged with said drive sprocket, and
means for selectively actuating said first and second braking means.

21. The apparatus of claim 20 including a rack fixed to and extending along said track, a gear journalled in said carriage and engaged with said rack, said second braking means comprising means for resisting rotation of said gear.

22. The apparatus of claim 21 including a motor, a chain driving sprocket meshing with said chain and clutch means for selectively connecting said motor in driving relation to said chain driving sprocket, whereby either of said carriage or chuck may be selectively driven by said motor when said clutch means couples said chain driving sprocket to said motor, and, when the latter are decoupled, either one of said carriage or chuck may be operated by hand while motion of the other is restrained by the corresponding braking means.

23. The apparatus of claim 21 wherein said motion transmitting means comprises a plurality of mutually engaged gears including one fixed to said drive sprocket and one fixed to said chuck, said first brake means comprises a brake connected with a gear of said plurality of gears, and including first and second idler sprocket means journalled on said carriage adjacent said drive sprocket for holding said chain in engagement with substantially half of the periphery of said drive sprocket.

* * * * *

UNITED STATES PATENT AND TRADEMARK OFFICE
CERTIFICATE OF CORRECTION

PATENT NO. : 3,974,676
DATED : Aug. 17, 1976
INVENTOR(S) : Homer L. Eaton

It is certified that error appears in the above–identified patent and that said Letters Patent are hereby corrected as shown below:

Col. 5, line 6:  Change "on" to ---to---;

Col. 6, line 31: Change "Th" to ---The---;

Col. 7, line 1:  Between "two" and "members" insert ---driven---;

Col. 7, line 9:  Change "rotaton" to ---rotation---;

Col. 7, line 54: After "error" insert ---signal---;

Col. 8, line 22: Change "acutal" to ---actual---;

Col. 8, line 22: Change "of" to ---on---;

Col. 8, line 25: Change "stroage" to ---storage---;

Col. 8, line 64: After "carriage" insert ---is---;

Col. 8, line 66: Change "central" to ---control---;

Col. 9, line 39: After "further" insert ---,---;

Col. 9, line 51: Between "to" and "difference" delete ---the---;

Col. 9, line 56: Change "outpt" to ---output---;

UNITED STATES PATENT AND TRADEMARK OFFICE
CERTIFICATE OF CORRECTION

PATENT NO. : 3,974,676
DATED : Aug. 17, 1976
INVENTOR(S) : Homer L. Eaton

It is certified that error appears in the above-identified patent and that said Letters Patent are hereby corrected as shown below:

Col. 10, line 7: Between "of" and "first" insert ---a---;

Col. 10, line 16: Before "distance" insert ---via---.

Signed and Sealed this

Fourth Day of January 1977

[SEAL]

Attest:

RUTH C. MASON
*Attesting Officer*

C. MARSHALL DANN
*Commissioner of Patents and Trademarks*